United States Patent
Sundaram et al.

(10) Patent No.: US 9,104,858 B1
(45) Date of Patent: Aug. 11, 2015

(54) PROTECTING USER IDENTITY AT A CLOUD USING A DISTRIBUTED USER IDENTITY SYSTEM

(75) Inventors: Sharada Sundaram, Mountain View, CA (US); Robert Koeten, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 251 days.

(21) Appl. No.: 13/463,618

(22) Filed: May 3, 2012

Related U.S. Application Data (60) Provisional application No. 61/482,189, filed on May 3, 2011.

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| G06F 21/50 | (2013.01) |

(52) U.S. Cl.
CPC ...................................... *G06F 21/50* (2013.01)

(58) Field of Classification Search
CPC ................................ H04L 63/08; H04L 63/10
USPC ............................................................ 726/3
See application file for complete search history.

(56) References Cited

U.S. PATENT DOCUMENTS

| | | | | |
|---|---|---|---|---|
| 7,264,152 | B2 * | 9/2007 | Tsuei et al. | 235/380 |
| 8,020,195 | B2 * | 9/2011 | Frost et al. | 726/3 |
| 2001/0005890 | A1 * | 6/2001 | Nitaki | 713/202 |
| 2002/0141589 | A1 * | 10/2002 | Garay et al. | 380/277 |
| 2004/0230831 | A1 | 11/2004 | Spelman et al. | |
| 2004/0254894 | A1 * | 12/2004 | Tsuei et al. | 705/74 |
| 2005/0055426 | A1 * | 3/2005 | Smith et al. | 709/219 |
| 2006/0026438 | A1 * | 2/2006 | Stern et al. | 713/184 |
| 2006/0248598 | A1 | 11/2006 | Johnson et al. | |
| 2007/0294750 | A1 * | 12/2007 | Burch et al. | 726/5 |
| 2009/0287750 | A1 * | 11/2009 | Banavar et al. | 707/204 |
| 2011/0087854 | A1 * | 4/2011 | Rushworth et al. | 711/170 |
| 2011/0231280 | A1 | 9/2011 | Farah | |
| 2011/0231899 | A1 | 9/2011 | Pulier et al. | |
| 2011/0246765 | A1 * | 10/2011 | Schibuk | 713/158 |
| 2011/0265147 | A1 | 10/2011 | Liu | |
| 2011/0307947 | A1 | 12/2011 | Kariv et al. | |
| 2012/0144501 | A1 | 6/2012 | Vangpat et al. | |
| 2012/0233265 | A1 * | 9/2012 | Joy et al. | 709/206 |
| 2012/0278861 | A1 | 11/2012 | Lu | |
| 2013/0024919 | A1 * | 1/2013 | Wetter et al. | 726/6 |
| 2013/0060839 | A1 | 3/2013 | Van Biljon et al. | |
| 2013/0067549 | A1 | 3/2013 | Caldwell et al. | |

OTHER PUBLICATIONS

Zhexuan Song; Trusted Anonymous Execution: A Model to Raise Trust in Cloud; Nov. 1-5, 2010 ; p. 133-138.*
USPTO Non-Final Office Action mailed Aug. 13, 2013 for U.S. Appl. No. 13/463,612. 7 pages.
USPTO Notice of Allowance mailed Feb. 18, 2014 for U.S. Appl. No. 13/463,612. 7 pages.

* cited by examiner

*Primary Examiner* — Monjour Rahim
(74) *Attorney, Agent, or Firm* — Lowenstein Sandler LLP (57) ABSTRACT

A computing system assigns an anonymous cloud account to a user in response to a determination that identity information of the user is validated for a request to access a cloud. The anonymous cloud account does not reveal an identity of the user to the cloud. The computing system creates mapping data that associates the user with the anonymous cloud account. The cloud does not have access to the mapping data. The computing system facilitates user access to the cloud based on the anonymous cloud account. The cloud generates cloud access pattern data for the anonymous cloud account without determining the identity of the user.

17 Claims, 9 Drawing Sheets

Cloud Access Pattern Data for CloudA — 701

| Anonymous Cloud Account Identifier 703 | Session Identifier 719 | Start 705 | End 707 | Data Identifier 709 |
|---|---|---|---|---|
| CloudA-AccountX | abcde1234 | 03/26/2012 14:53 | 03/26/2012 17:08 | MonthClosedSales<br>CustomerZ-Email-1<br>CustomerZ-ContactInfo<br>CustomerZ-Appointment<br>PipelineReport<br>TopDeals<br>AccountsSummary<br>LeadsSummary<br>ForecastSummary<br>PricingProposal |
| CloudA-AccountY | 94mkie586 | 03/26/2012 18:13 | 03/26/2012 18:47 | CustomerQ-ContactInfo<br>CustomerQ-Appointment |
| CloudA-AccountZ | qu06in0n5 | 03/26/2012 19:24 | 03/26/2012 22:07 | CustomerProposal |
| CloudA-AccountX | ev0507and | 03/26/2012 19:02 | 03/26/2012 19:12 | CustomerE-ContactInfo<br>CustomerE-Appointment |

711, 713, 715, 717

Cloud Access Pattern Data for CloudB — 750

| Anonymous Cloud Account Identifier 753 | Session Identifier 763 | Start 755 | End 757 | Data Identifier 759 |
|---|---|---|---|---|
| CloudB-AccountZ | abcde1234 | 03/26/2012 15:39 | 03/26/2012 15:49 | MarchExpenseReport |

761

Result Table for CloudA (800)

| User Identifier 801 | Anonymous Cloud Account Identifier 803 | Session Identifier 819 | Start 805 | End 807 | Data Identifier 809 |
|---|---|---|---|---|---|
| Jane Doe | CloudA-AccountX | abcde1234 | 03/26/2012 14:53 | 03/26/2012 17:08 | MonthClosedSales<br>CustomerZ-Email-1<br>CustomerZ-ContactInfo<br>CustomerZ-Appointment<br>PipelineReport<br>TopDeals<br>AccountsSummary<br>LeadsSummary<br>ForecastSummary<br>PricingProposal |
| Sally Brown | CloudA-AccountY | 94mkie586 | 03/26/2012 18:13 | 03/26/2012 18:47 | CustomerQ-ContactInfo<br>CustomerQ-Appointment |
| Adam Black | CloudA-AccountZ | qu06in0n5 | 03/26/2012 19:24 | 03/26/2012 22:07 | CustomerProprosal |

811 → (Jane Doe row)
813 → (Sally Brown row)
815 → (Adam Black row)

FIG. 8

Result Table for CloudA

| User Identifier 901 | Role 903 | Application 905 | Anonymous Cloud Account Identifier 907 | Session Identifier 919 | Start 909 | End 911 | Data Identifier 913 |
|---|---|---|---|---|---|---|---|
| Jane Doe | Chief Executive Officer | Customer Relationship Management Application | CloudA-AccountX | abcde1234 | 03/26/ 2012 14:53 | 03/26/ 2012 17:08 | MonthClosedSales CustomerZ-Email-1 CustomerZ-ContactInfo CustomerZ-Appointment PipelineReport TopDeals AccountsSummary LeadsSummary ForecastSummary PricingProposal |
| Sally Brown | Vice President Sales | Customer Relationship Management Application | CloudA-AccountY | 94mkie586 | 03/26/ 2012 18:13 | 03/26/ 2012 18:47 | CustomerQ-ContactInfo CustomerQ-Appointment |
| Adam Black | Regional Sales Manager | Customer Relationship Management Application | CloudA-AccountZ | qu06in0n5 | 03/26/ 2012 19:24 | 03/26/ 2012 22:07 | CustomerProposal |

PROTECTING USER IDENTITY AT A CLOUD USING A DISTRIBUTED USER IDENTITY SYSTEM

RELATED APPLICATIONS

This application is related to and claims the benefit of U.S. Provisional Patent Application No. 61/482,189 filed May 3, 2011, which is hereby incorporated by reference herein.

TECHNICAL FIELD

Embodiments of the present disclosure relate to user identity at a cloud and, more particularly, to a technique of protecting user identity at a cloud using a distributed user identity system.

BACKGROUND

A business, corporation, and/or company, is commonly referred to as an Enterprise. Cloud computing is generally becoming the platform of choice for Enterprises that want to reduce operating expenses and be able to scale resources rapidly. "Clouds" may be provided by different cloud providers to provide Enterprises access of computing resources over a computer network. Clouds can provide Software-as-a-service (SaaS), sometimes referred to as "on-demand software," to various Enterprises. SaaS is a software delivery model in which software and its associated data are hosted centrally, typically in a cloud, and are accessed by user using, for example, a web browser, over the Internet. SaaS has become a common delivery model for most business applications, such as customer relationship management (CRM).

Privacy and security is becoming a very important factor in a SaaS environment. A cloud provider may have policies to restrict cloud provider employees from having access to Enterprise data that is being stored and accessed at the cloud. The policies, however, may be easily bypassed such that employees of the cloud provider may identify which Enterprise users are accessing what cloud data. The Enterprise may wish to conceal which Enterprise users are accessing the cloud and may wish to not reveal what files are being accessed by a particular user. For example, ACME Enterprise may wish to conceal that the ACME Chief Financial Officer is accessing a quarter end financial report. The conventional policies and security measures at the cloud provider may not provide adequate privacy and security controls for the Enterprise.

SUMMARY

In one embodiment, a system for protecting user identity at a cloud using a distributed user identity system is described. An exemplary system may include a memory and a processor that is coupled to the memory. In one embodiment, the system assigns an anonymous cloud account to a user in response to a determination that identity information of the user is validated for a request to access a cloud. The anonymous cloud account does not reveal an identity of the user to the cloud. The system creates mapping data that associates the user with the anonymous cloud account. The cloud does not have access to the mapping data. The system facilitates user access to the cloud based on the anonymous cloud account. The cloud generates cloud access pattern data for the anonymous cloud account without determining the identity of the user.

In one embodiment, the anonymous cloud account includes an anonymous cloud account identifier that does not reveal the identity of the user to the cloud and the system provides the anonymous cloud account identifier to the cloud. The cloud generates the cloud access pattern data using the anonymous cloud account identifier.

In one embodiment, the system receives the cloud access pattern data associated with the anonymous cloud account from the cloud and correlates the cloud access pattern data with the mapping data to identify a user that accessed cloud content that is specified in the cloud access pattern data. In one embodiment, the cloud access pattern data is a cloud access pattern database table and the mapping data is a mapping database table. In one embodiment, the system correlates the cloud access pattern data with the mapping data by joining fields of the cloud access pattern database table and the mapping database table.

In one embodiment, the cloud access pattern data comprises the anonymous cloud account identifier, an access start time indicator, an access end time indicator, and content identifiers of cloud content that is being accessed using the anonymous cloud account. In one embodiment, the mapping data comprises a user identifier, an access start time indicator, an access end time indicator, and an anonymous cloud account identifier of the anonymous cloud account that is assigned to the user.

In additional embodiments, methods for performing the operations of the above described embodiments are also implemented. Additionally, in embodiments of the present disclosure, a non-transitory computer readable storage medium stores methods for performing the operations of the above described embodiments.

BRIEF DESCRIPTION OF THE DRAWINGS

Various embodiments of the present disclosure will be understood more fully from the detailed description given below and from the accompanying drawings of various embodiments of the disclosure.

DETAILED DESCRIPTION

Embodiments of the invention are directed to a method and system for protecting user identity at a cloud using a distributed user identity system. A computing system assigns an anonymous cloud account to a user in response to a determination that identity information of the user is validated for a request to access a cloud. The anonymous cloud account does not reveal an identity of the user to the cloud. Examples of the identity of a user can include, and are not limited to, a name of a user, a work title associated with the user, an employee identifier of the user, a personal identifier of a user (e.g., social security number, driver license number, etc.), a credential of a user (e.g., user name), etc. The computing system creates mapping data that associates the user with the anonymous cloud account. The mapping data is stored, for example, within an Enterprise environment, where the cloud does not have access to the mapping data. The mapping data can be used, for example, by an Enterprise, to associate the user with cloud access pattern data generated by the cloud, for example, for auditing, compliance, and/or verification purposes. The computing system facilitates user access to the cloud based on the anonymous cloud account. The cloud generates the cloud access pattern data (e.g., access log) for the anonymous cloud account without determining the identity of the user.

Embodiments of the invention provide Enterprises privacy and security when Enterprise users access data at a cloud. An enterprise as referred to herein can represent any organization including, for example, a business organization such as a corporation, an educational institution such as a college and university, etc. The distributed user identity system creates a more private cloud session by not revealing an identity of a user that is accessing the cloud. The distributed user identity system also creates a more secure cloud session by separating the identity data (e.g., mapping data) from the cloud access pattern data (e.g., cloud access log).

Figure 1:
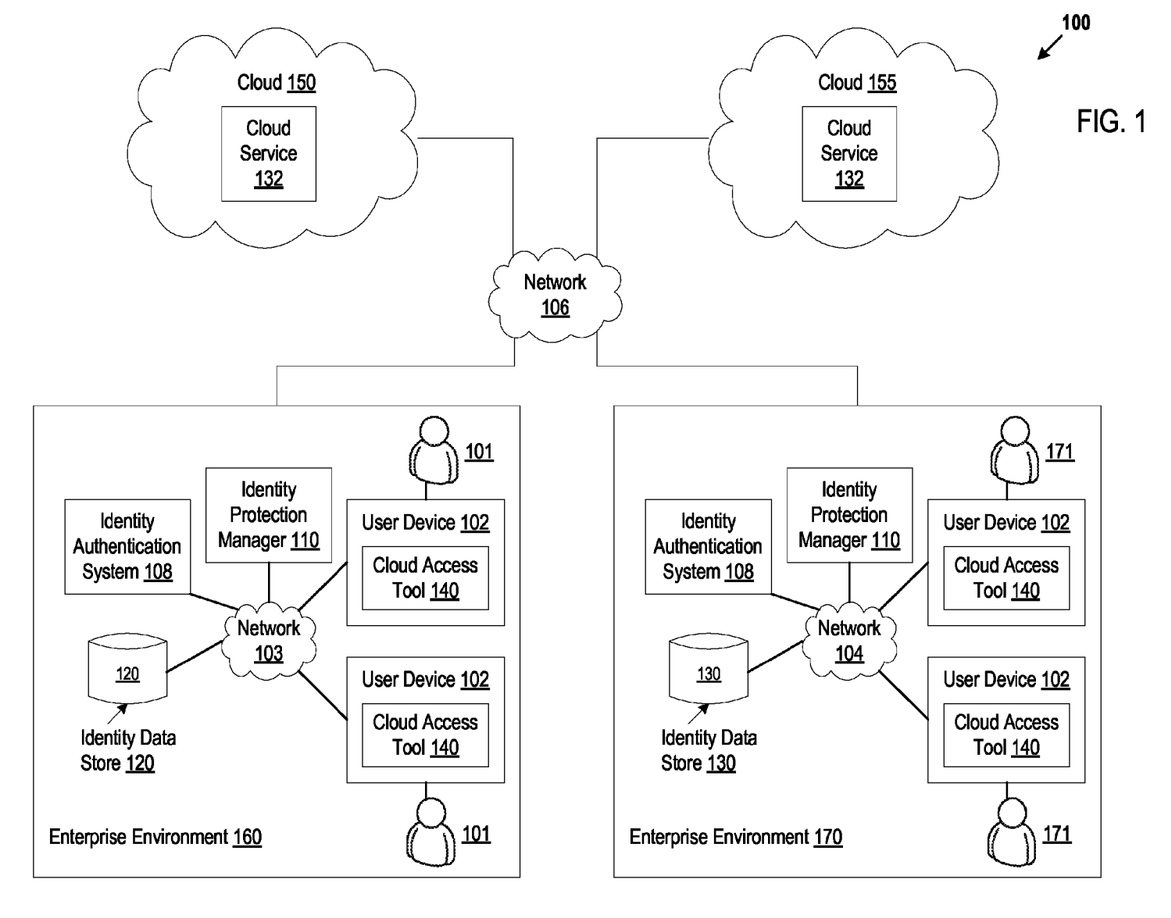
FIG. 1 illustrates exemplary system architecture, in accordance with various embodiments of the present disclosure.

FIG. 1 is a block diagram of an exemplary network architecture 100 in which embodiments of the present invention can be implemented. The network architecture 100 can include one or more enterprise (e.g., business, corporation, company) environments 160,170 including one or more user devices 102 communicating with one or more clouds 150,155 via a network 106. The network 106 can be a local area network (LAN), a wireless network, a mobile communications network, a wide area network (WAN), such as the Internet, or similar communication system, and can include any number of networking and computing devices such as wired and wireless devices.

The user devices 102 can be portable computing devices such as, and not limited to, laptop or tablet computers, cellular telephones (e.g., smartphones), personal digital assistants (PDAs), portable media players, netbooks, and the like. The user devices 102 can be non-portable computing devices such as, and not limited to, desktop computers, set-top boxes associated with a television, gaming consoles, and so on. The user devices 102 can be variously configured with different features to enable access to the various cloud services 132 made available by the clouds 150,155. A user device 102 can host a cloud access tool 140 to access the clouds 150,155. Examples of a cloud access tool 140 include, and are not limited to, a desktop web browser, a mobile device web browser, a mobile device application, a cloud connector plugin (e.g., cloud email connector plugin), a link (e.g., URL in an email), etc.

A cloud 150,155 can provide one or more cloud services 132 to Enterprise environments 160,170 using cloud computing. An enterprise as referred to herein can represent any organization including, for example, a business organization such as a corporation, an educational institution such as a college and university, etc. The cloud 150,155 can use a Software-as-a-Service (SaaS) model in which cloud computing companies provide software functionality, for example, to Enterprise users 101,171 on a subscription basis. A cloud 150,155 can include one or more server computing systems to implement the SaaS model. The server computing systems are controlled by a cloud service provider and not an enterprise. Examples of cloud services 132 are business applications, running on the cloud and including, for example, accounting, collaboration, customer relationship management (CRM), enterprise resource planning (ERP), invoicing, human resource management (HRM), content management (CM), and service desk management.

The enterprise environment 160,170 can include an identity authentication system 108 to authenticate users 101,171 via first factor credentials (e.g. usernames, passwords) and/or second factor credentials, such as one-time password (OTP), a digital certificate (e.g., public key infrastructure (PKI) certificate), a fingerprint, etc. The identity authentication system 108 can manage the user credentials in an identity data store 120,130 that is coupled to the identity authentication system 108 for user authentication. The identity data store 120,130 can be a directory (e.g., Active Directory, Lightweight Data Access Protocol (LDAP) directory) that stores the credentials for a corresponding enterprise environment 160,170. The identity authentication system 108 can be a Single Sign-On (SSO) system. The SSO system can allow a user 101,171 to login to a corresponding local Enterprise network 103,104 using a single set of credentials and have access, according to access policies, to the cloud services 132 provided by the clouds 150,155 without having to individually login to each cloud service 132. The identity authentication system 108 can be configured to communicate with a provisioning interface (e.g., SSO interface, Security Assertion Markup Language (SAML) interface) at the clouds 150,155. The identity authentication system 108 may reside on a machine (e.g., server computers, desktop computers, etc.). The identity authentication system 108 may be maintained by an Enterprise (e.g., business, company). In another embodiment, the identity authentication system 108 may be maintained by a third party.

Each enterprise environment 160,170 can include an identity protection manager 110 to conceal the identity of corresponding users 101,171 at a cloud 150,155 by separating identity data of users 101,171 accessing a cloud 150,155 from the access pattern data of the cloud accounts used by the users 101,171. The identity protection manager 110 can create a distributed user identity environment that stores the identity data of the user 101,171 at the corresponding Enterprise environment 160,170. Cloud access pattern data (e.g., access logs) is generated by the cloud 150,155 and is stored at the cloud 150,155. The distributed user identity environment can prevent a cloud 150,155 from identifying that a particular user 101,171 (e.g., Chief Financial Officer) accessed particular cloud data (e.g., Annual Financial Report).

The identity protection manager 110 can assign anonymous cloud accounts to users 101,171. The anonymous cloud accounts do not reveal the identity of the users 101,171 to the cloud 150,155. A cloud 150,155 may determine that a user is accessing the cloud 150,155 via an anonymous cloud account, but the cloud 150,155 does not have information to determine the identity of the user 101,171 that is accessing the cloud 150,155.

The identity protection manager 110 can create and store mapping data in an Enterprise environment 160,170 to track the one or more anonymous cloud accounts that are assigned to the corresponding users 101,171. Each Enterprise environment 160,170 can create and store its own mapping data within its own environment. For example, for Enterprise environment 160, the clouds 150,155, employees of the clouds 150,155, other Enterprise environments 170, and users 171 in the other Enterprise environments 170 do not have access to the mapping data that is stored in the Enterprise environment 160. One embodiment of the mapping data is described in greater detail below in conjunction with FIG. 6. The identity protection manager 110 can create a distributed user identity system by separating data (e.g., mapping data) that associates a user identity with an anonymous cloud account from the data (e.g., cloud access log) that tracks what cloud data is being accessed via the anonymous cloud account.

When an anonymous cloud account is assigned to a user, the identity protection manager 110 can provide the anonymous cloud account identifier of the anonymous cloud account to the cloud 150,155. The cloud 150,155 does not receive any information that can reveal the identity of the user to the cloud 150,155. The cloud 150,155 generates cloud access pattern data (e.g., access log) using the anonymous cloud account identifier. The cloud access pattern data can include, for example, the anonymous account identifier, an access start time indicator (e.g., login timestamp), an access end time indicator (e.g., logout timestamp), and content identifier (e.g., file names, file locations, etc.) of the content in the cloud that is being accessed. One embodiment of the cloud access pattern data is described in greater detail below in conjunction with FIG. 7.

The cloud 150,155 can send the cloud access pattern data to the identity protection manager 110, for example, for auditing, compliance, and/or verification purposes. The identity protection manager 110 can receive the cloud access pattern data associated with the anonymous cloud account from the cloud and identify which user 101,171 is assigned to the anonymous cloud account identifier that is included in the cloud access pattern data using the mapping data.

Figure 2:
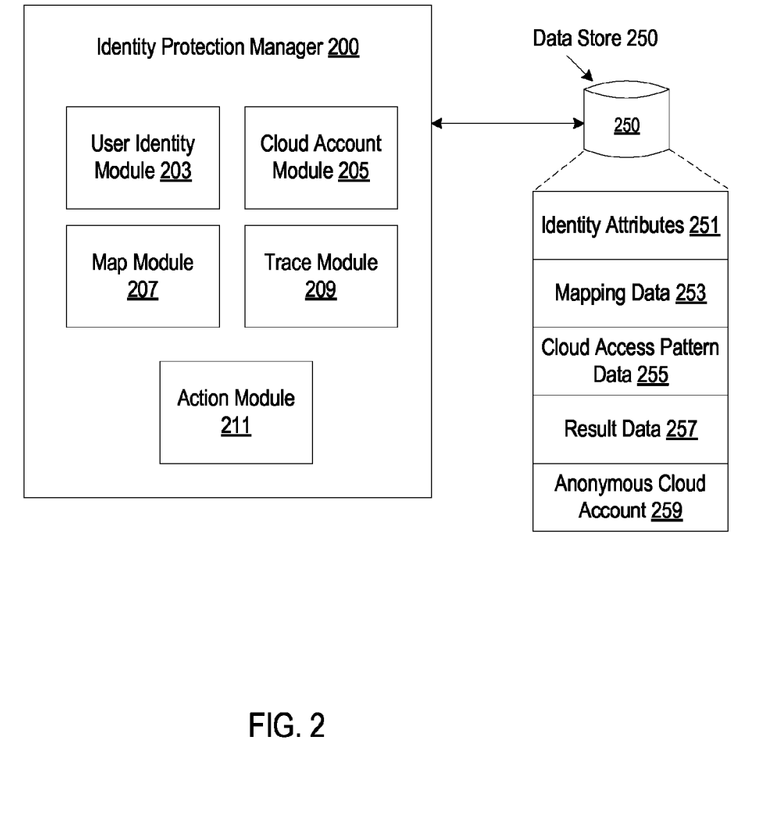
FIG. 2 is a block diagram of an identity protection manager, in accordance with some embodiments.

FIG. 2 is a block diagram of an identity protection manager 200, in accordance with some embodiments. The identity protection manager 200 may be the same as the identity protection manager 200 in FIG. 1. The identity protection manager 200 includes a user identity module 203, a cloud account module 205, a map module 207, a trace module 209, and an action module 211. Note that in alternative embodiments, the functionality of the user identity module 203, the cloud account module 205, the map module 207, the trace module 209, and the action module 211 may be combined or divided.

The user identity module 203 can capture identity attributes of a user and store the identity attributes 251 in a data store 250 that is coupled to the identity protection manager 200. A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The user identity module 203 can be coupled to an identity authentication system (e.g., identity authentication system 108 in FIG. 1) to determine whether a user is validated to access a cloud. The user identity module 203 can receive the identity attributes of a user, for example, when a user successfully logs into the identity authentication system via credentials. Examples of the identity attributes 251 can include, and are not limited to, user identifier, role, application (e.g., cloud service) being requested, etc. The identity attributes 251 can be stored in a data structure, such as a database. One embodiment of identity attributes is described in greater detail below in conjunction with FIG. 5.

The cloud account module 205 can assign an anonymous cloud account to a user that has been authenticated by an identity authentication system. The cloud account module 205 can provide an anonymous cloud account identifier to a cloud. An anonymous cloud account is an account that does not reveal the identity of a user to the cloud which the user is accessing. In one embodiment, an anonymous cloud account is a dynamically shared account. In another embodiment, an anonymous cloud account is an account dedicated to one user and is associated with an alias name. In one embodiment, the cloud account module 205 randomly selects an available anonymous cloud account 259 that is stored in the data store 250 and assigns it to the user. In another embodiment, the cloud account module 205 selects an available anonymous cloud account 259 based on an identity attribute 251 of the user.

The map module 207 can create and/or update mapping data 253 to associate the identity attributes 251 of a user to the anonymous cloud account that is assigned to the user. The mapping data 253 can be stored securely in the data store 250 to prevent a cloud from accessing the mapping data 253. For example, processing logic stores the mapping data 253 in a data store within an Enterprise network which a cloud does not have access to. The mapping data 253 can be stored in a data structure, such as a database table. The mapping data 253 can include one record in the database table for each time a user is assigned an anonymous cloud account for each cloud. The mapping data 253 can include a user identifier, an access start time indicator (e.g., login timestamp), an access end time indicator (e.g., logout timestamp), and an anonymous cloud account identifier of the anonymous cloud account that is assigned to the user. One embodiment of mapping data is described in greater detail below in conjunction with FIG. 6.

The trace module 209 can receive cloud access pattern data 255 from a cloud. The cloud access pattern data 255 can be stored in the data store 250. The cloud access pattern data 255 represents cloud access activity that is associated with an anonymous cloud account. For example, the cloud access data 255 describes what cloud content was accessed using the anonymous cloud account, when the cloud content was accessed, the type (e.g., read access, write access) of access, etc. The cloud access pattern data 255 can include, for example, an anonymous cloud account identifier, an access start time indicator (e.g., login timestamp), an access end time indicator (e.g., logout timestamp), and content identifier (e.g., file names, file locations, etc.) of the content in the cloud that is being accessed. One embodiment of cloud access pattern data is described in greater detail below in conjunction with FIG. 7.

The trace module 209 can combine mapping data 253 with the cloud access pattern data 255 to create result data 257 that indicates the identity of a user that is associated with the cloud access pattern data 255 received from a cloud. The result data 257 identifies who accessed what data in the cloud and when the data was accessed, for example, for auditing purposes, compliance purposes, verification purposes, etc. Embodiments of the result data are described in greater detail below in conjunction with FIG. 8 and FIG. 9.

The action module 211 can perform an action based on the association of the identity of the user with the cloud access pattern data. Examples of actions can include, and are not limited to, audit actions (e.g., create an audit report), compliance actions, verification actions, notification actions (e.g., send a message to a system administrator), access actions (e.g., block cloud access), account management action (e.g., disable a user account in an identity authentication system). One embodiment of performing an action is described in greater detail below in conjunction with FIG. 3.

Figure 3:
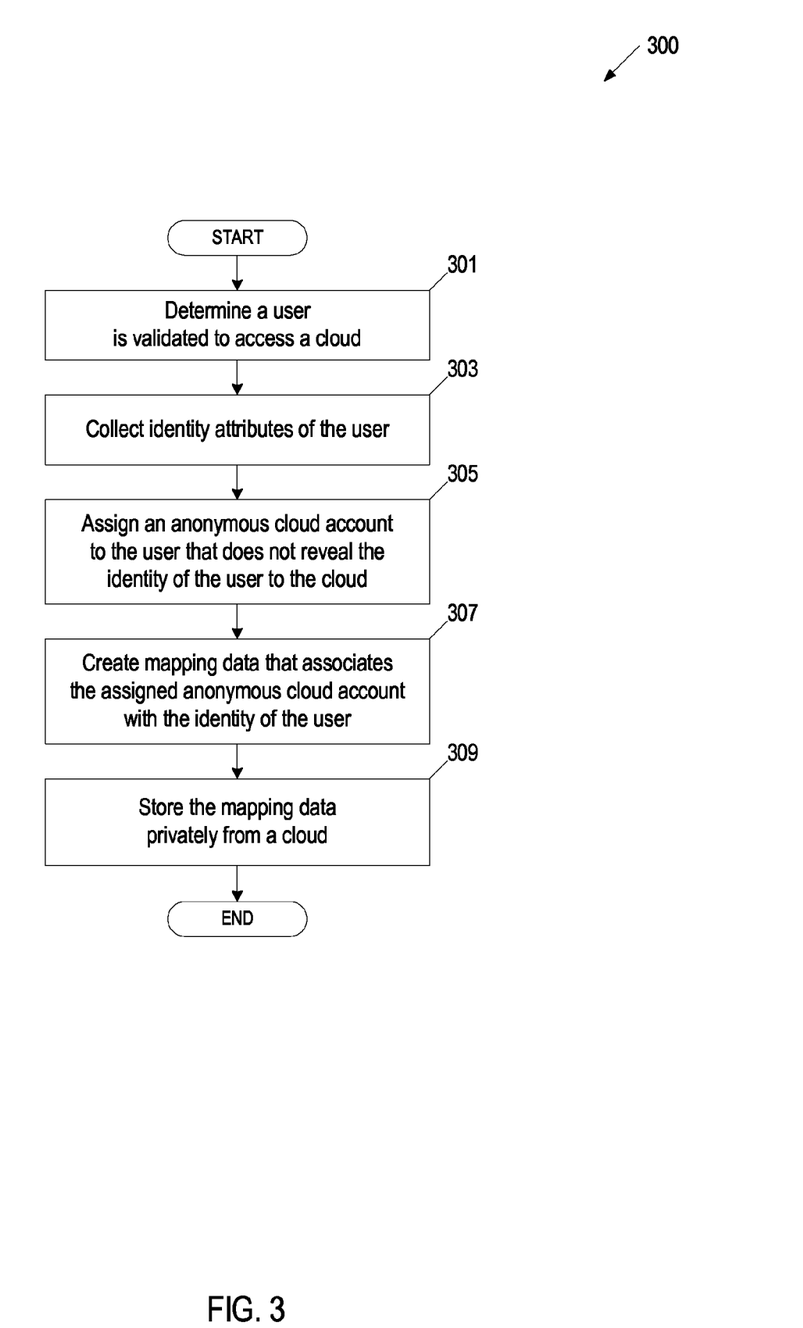
FIG. 3 is a flow diagram of an embodiment of a method for protecting user identity at a cloud using a distributed user identity system.

FIG. 3 is a flow diagram of an embodiment of a method 300 for protecting user identity at a cloud using a distributed user identity system. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by an identity protection manager 110 of FIG. 1.

At block 301, processing logic determines a user is validated to access a cloud. Processing logic can determine that a user has been authenticated by an identity authentication system. For example, a user successfully logs into an Enterprise network using credentials and requests access to a particular cloud. Processing logic can receive a message from the identity authentication system indicating that the user is authorized to access the requested cloud. Processing logic may determine any number of users are validated to access any number of clouds. Processing logic may determine that a user is validated to access multiple clouds.

At block 303, processing logic collects identity attributes associated with a user and stores identity attribute data in a data store. Processing logic can collect identity attribute data for each user for each cloud. Processing logic can request and receive identity attribute data from the identity authentication system. Processing logic can store the identity attribute data in a data structure, such as a database table. One embodiment of identity attributes is described in greater detail below in conjunction with FIG. 5.

At block 305, processing logic assigns an anonymous cloud account to the user. The anonymous cloud account does not reveal the identity of the user to the cloud. The anonymous cloud account can be an account that uses an alias name. For example, the anonymous cloud account can use an alias name "User-XYZ." In one embodiment, the anonymous cloud account is a dynamically shared account. Processing logic can be coupled to a data store that stores anonymous cloud account data indicating the available anonymous cloud accounts for each cloud that can be assigned to a user. Processing logic can randomly assign an available anonymous cloud account and/or assign an available anonymous cloud account based on one or more identity attributes of the user. At block 307, processing logic creates and/or updates mapping data that associates the identity of the user with the anonymous cloud account that is assigned to the user and privately stores the mapping data at block 309. The mapping data can be subsequently used to associate a user identity to an anonymous cloud account. Method 300 can be executed each time an anonymous cloud account for any cloud service (e.g., cloud service 132 in FIG. 1) is assigned to allow access to the corresponding cloud service, according to some embodiments. One embodiment of mapping data including a record for each time an anonymous cloud account is provisioned out is described in greater detail below in conjunction with FIG. 6.

Figure 4:
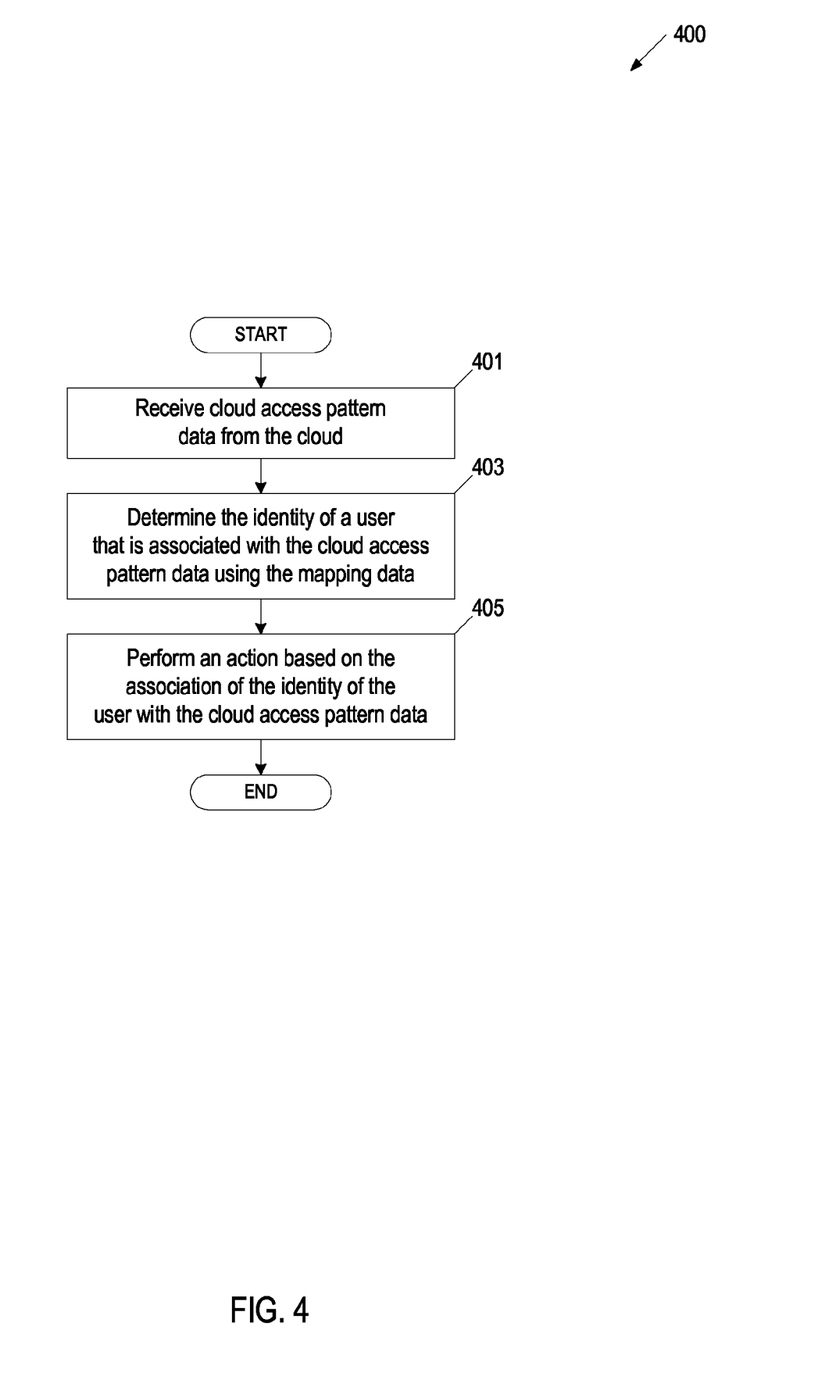
FIG. 4 illustrates exemplary identity attributes, according to some embodiments.

FIG. 4 is a flow diagram of an embodiment of a method 400 for mapping a user identity to cloud activity using a distributed user identity system. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by an identity protection manager 110 of FIG. 1.

At block 401, processing logic receives cloud access pattern data from a cloud. Processing logic can send a request to the cloud for the cloud access pattern data. In another example, the cloud can automatically send the cloud access pattern data to the identity protection manager based on a policy. Processing logic may receive cloud access pattern data from more than one cloud. The cloud access pattern data can be a cloud access log. In one embodiment, the cloud access pattern data is received from a cloud in a data structure format, such as a database table. In another embodiment, processing logic formats the cloud access pattern data received from a cloud into a data structure format. One embodiment of cloud access pattern data is described in greater detail below in conjunction with FIG. 7.

At block 403, processing logic determines the identity of a user that is associated with the cloud access pattern data using mapping data that is privately stored in a data store that is coupled to the identity protection manager. Processing logic can combine fields from two or more database tables (e.g., mapping data tables, cloud access pattern data tables, identity attributes tables), for example, by using values common to each table to create a result table. The result table identifies which user is assigned to which anonymous cloud account. In one embodiment, processing logic executes a join function to combine records from two or more database tables to create a result table. Embodiments of a result table are described in greater detail below in conjunction with FIG. 8 and FIG. 9.

At block 405, processing logic performs an action based on the association of the identity of the user with the cloud access pattern data. Examples of actions can include, and are not limited to, audit actions, compliance actions, verification actions, notification actions, access actions, account management actions, etc. Method 400 can execute periodically according to some embodiments. The period can be based, for example, on a policy (e.g., Enterprise policy). For example, an Enterprise may conduct a data audit for maintenance. The Enterprise may perform a monthly and/or yearly data audit to determine whether the Enterprise data is in tact, what data was accessed, who accessed what data, etc. Method 400 can execute in response trigger (e.g., cloud data breach) according to some embodiments. A cloud may identify a data breach in association with a particular anonymous cloud account identifier and a particular login timestamp and logout timestamp. Processing logic can receive the information from the cloud and link the data break to an identity of a user using the mapping data. Processing logic can send a notification to one or more users (e.g., system administrators) with the user identity information.

Figure 5:
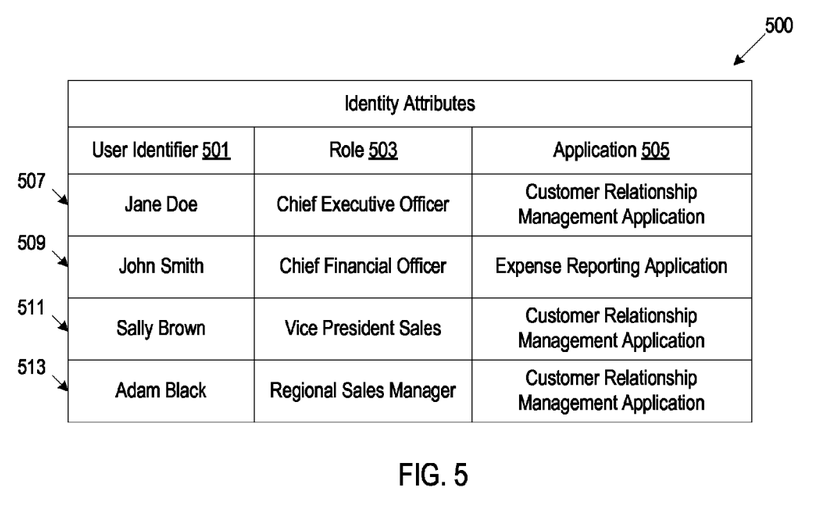
FIG. 5 illustrates exemplary mapping data, according to some embodiments.

FIG. 5 illustrates exemplary identity attributes 500, according to some embodiments. In one embodiment, the identity attributes 500 is a database table. Examples of the identity attributes can include, and are not limited to, a user identifier, a role of the user, and application (e.g., cloud service) in a cloud being requested by the user, etc. The identity attributes 500 table can include records 507,509,511,513 to represent each time a user accesses a cloud. For example, the identity attributes 500 can include a record for when a user accesses a CRM application and may subsequently create another record for when the same user accesses an expense reporting application. For each record, the identity attributes 500 table can include, and is not limited to, a user identifier field 501, a role field 503, and an application field 505. The user identifier field 501 can include for example, and not limited to, a name of a user, an employee identifier of the user, a personal identifier of a user (e.g., social security number, driver license number, etc.), a credential of a user (e.g., user name, digital certificate, token, etc.), etc. The role field 503, can include, for example, and not limited to, a work title associated with the user (e.g., Chief Executive Officer, Chief Financial Officer, Director, Manager, System Administrator, etc.) and an Enterprise organization associated with the user (e.g., finance, information technology, human resources, engineering, etc.). The application field 505 can include an application identifier, such as, and not limited to, a name of an application.

Figure 6:
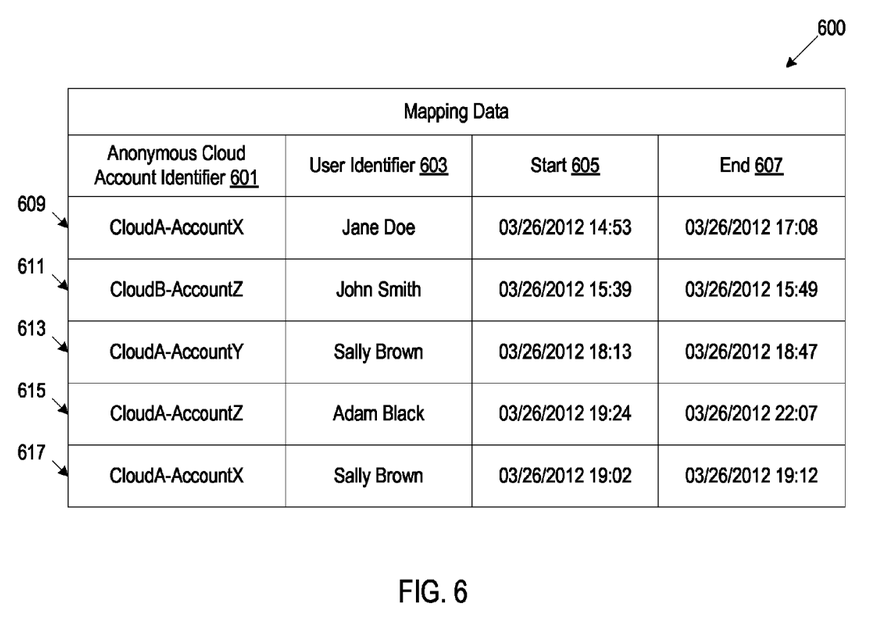
FIG. 6 illustrates exemplary cloud access pattern data, according to some embodiments.

FIG. 6 illustrates exemplary mapping data 600, according to some embodiments. The mapping data 600 is a database table. The mapping data 600 table can include any number of records 609,611,613,615,617 to represent each time an anonymous cloud account is provisioned out to allow access to a cloud service. For example, the mapping data 600 includes records 509,517 to represent each time the anonymous cloud account "CloudA-AccountX" is provisioned out. A user may be provisioned with the same and/or a different anonymous cloud account each time the user is logging in to access a cloud service. For example, Sally Brown has a first session with CloudA using the anonymous cloud account "CloudA-AccountY" and the mapping data 600 includes a record 613 for the first session. Subsequently, Sally Brown has a second session with CloudA using the anonymous cloud account "CloudA-AccountX" and the mapping data 600 includes a record 617 for the second session. In one embodiment, data for more than one cloud can be included in the same mapping data 600 table. For example, the mapping table 600 may include records 609,613,615,617 that pertain to CloudA and record 611 that pertains to CloudB. In another embodiment, data for different clouds are managed in separate mapping tables. For example, records 609,613,615,617 that pertain to CloudA may be included in a first mapping table and record 611 that pertain to CloudB may be included in a second mapping table.

For each record, the mapping data 600 can include, for example, and not limited to, a user identifier field 603, the anonymous account identifier field 601, a start field 605, and an end field 607. Each anonymous cloud account has an anonymous cloud account identifier (e.g., account number). The anonymous cloud account identifier can include a cloud identifier (e.g., cloud name). The anonymous cloud account identifier field 601 can include the anonymous cloud account identifier of the anonymous cloud account that is assigned to the user. The user identifier field 603 can include, for example, a name of a user, an employee identifier, a social security number, a driver license number, a credential of a user, etc. The user identifier field 603 can be populated with the user identifier in the identity attribute data for the user. The start field 605 can represent a date and/or time that an anonymous cloud account starts accessing the cloud. The end field 607 can represent a date and/or time that the anonymous cloud account ends access to the cloud. The start field 605 and end field 607 can be populated with data received from an identity authentication system.

Figure 7:
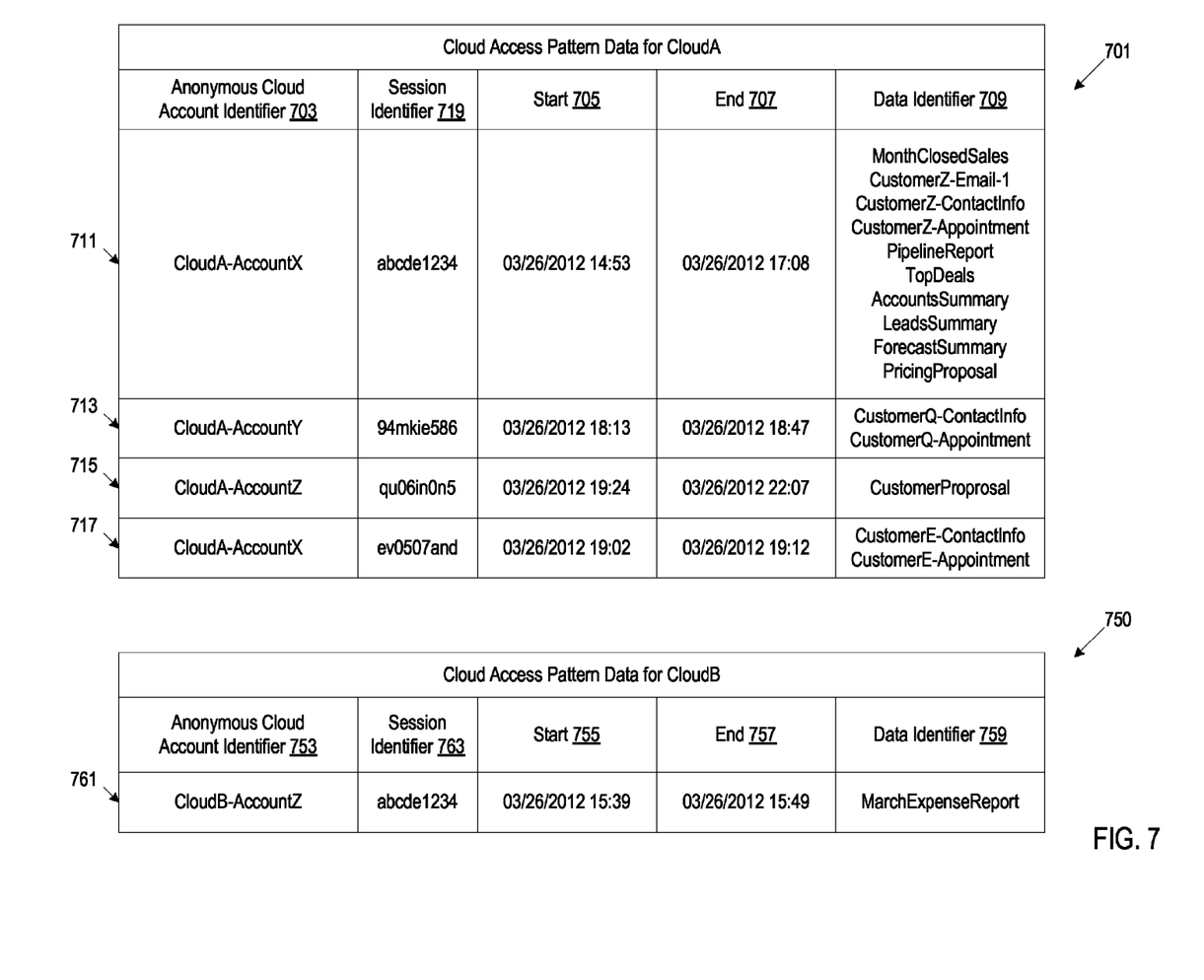
FIG. 7 illustrates an exemplary result table, according to some embodiments.

FIG. 7 illustrates exemplary cloud access pattern data 701, 750, according to some embodiments. The cloud access pattern data 701,750 can be access log files. In one embodiment, the cloud access pattern data 701,750 are database tables. The cloud access pattern data 701 table is generated by Cloud A and the cloud access pattern data 750 is generated by Cloud B. The cloud access pattern data 701,750 table can include records 711,713,715,717,761 to represent each cloud session for an anonymous cloud account for a particular cloud. For example, the cloud access pattern data 701 table includes a record 711 for a first session for CloudA-AccountX for CloudA and another record 717 for a different session for CloudA-AccountX for CloudA. For each record, the cloud access pattern data 701,750 table can include, for example, and not limited to, an anonymous cloud account identifier field 703,753, a session identifier field (or a session token field) 719,763, a start field 705,755, an end field 707,757, and a data identifier field 709,759. The anonymous cloud account identifier can be defined by an Enterprise, which the Enterprise can provide to a cloud. A session identifier (ID) can be a randomly-generated or pseudo-randomly generated string.

In one embodiment, the field 719,763 is a session token field. A session token is a unique identifier. The session token can be in the form of a hash. The session token can be a contextually unique identifier. For example, the session token is contextually unique for a cloud. The start field 705,755 can represent a date and/or time that an anonymous cloud account starts a session with the cloud. The end field 707 can represents a date and/or time that the anonymous cloud account ends a session with the cloud. The data identifier field 709,759 can represent the cloud data that is accessed using the corresponding anonymous cloud account for a session. The data identifier field 709,759 can include, for example, and not limited to a filename, a data location, etc.

Figure 8:
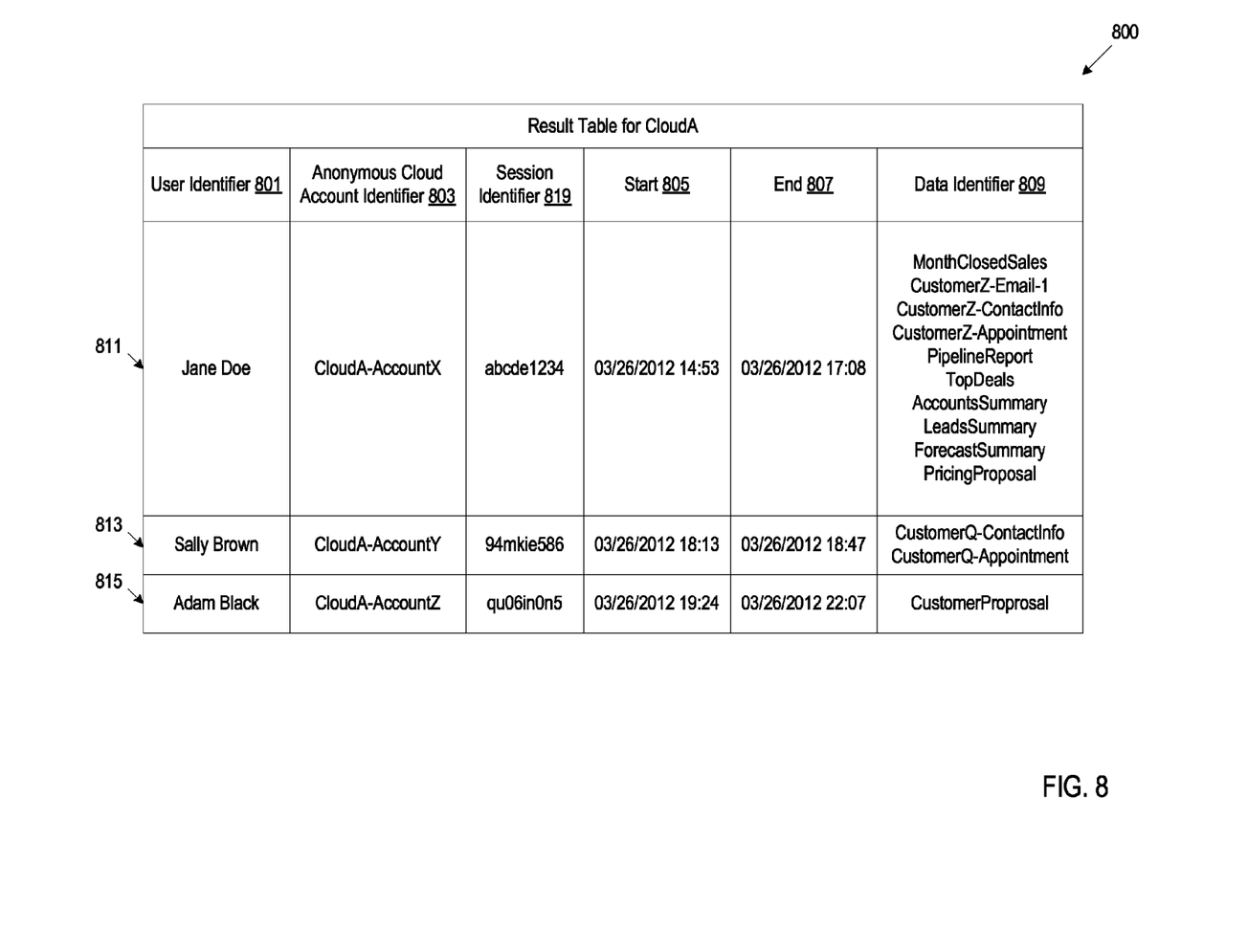
FIG. 8 illustrates an exemplary result table, according to some embodiments.

FIG. 8 illustrates an exemplary result table 800, according to some embodiments. The result table 800 is created, for example, by joining fields of a mapping data table (e.g., mapping table 600 in FIG. 6) that includes data for anonymous cloud account assigned to user for a particular cloud (e.g., CloudA) with a cloud access pattern data table (e.g., cloud access pattern data 701 in FIG. 7) for the particular cloud. A database join function can be performed, for example, based on the anonymous cloud account identifier field, start field, and/or end field. The result table 800 can include records 811,813,813 which have fields that indicate which user is associated with a particular anonymous cloud account identifier and the cloud data which the user accessed. For each record, the fields can include, for example, and not limited to, a user identifier field 801, an anonymous cloud account identifier field 803, a session identifier field (or a session token field) 819, a start field 805, an end field 807, and a data identifier field 809. For example, record 813 indicates that Sally Brown accessed CustomerQ-ContactInfo and CustomerQ-Appointment data in the CloudA.

Figure 9:
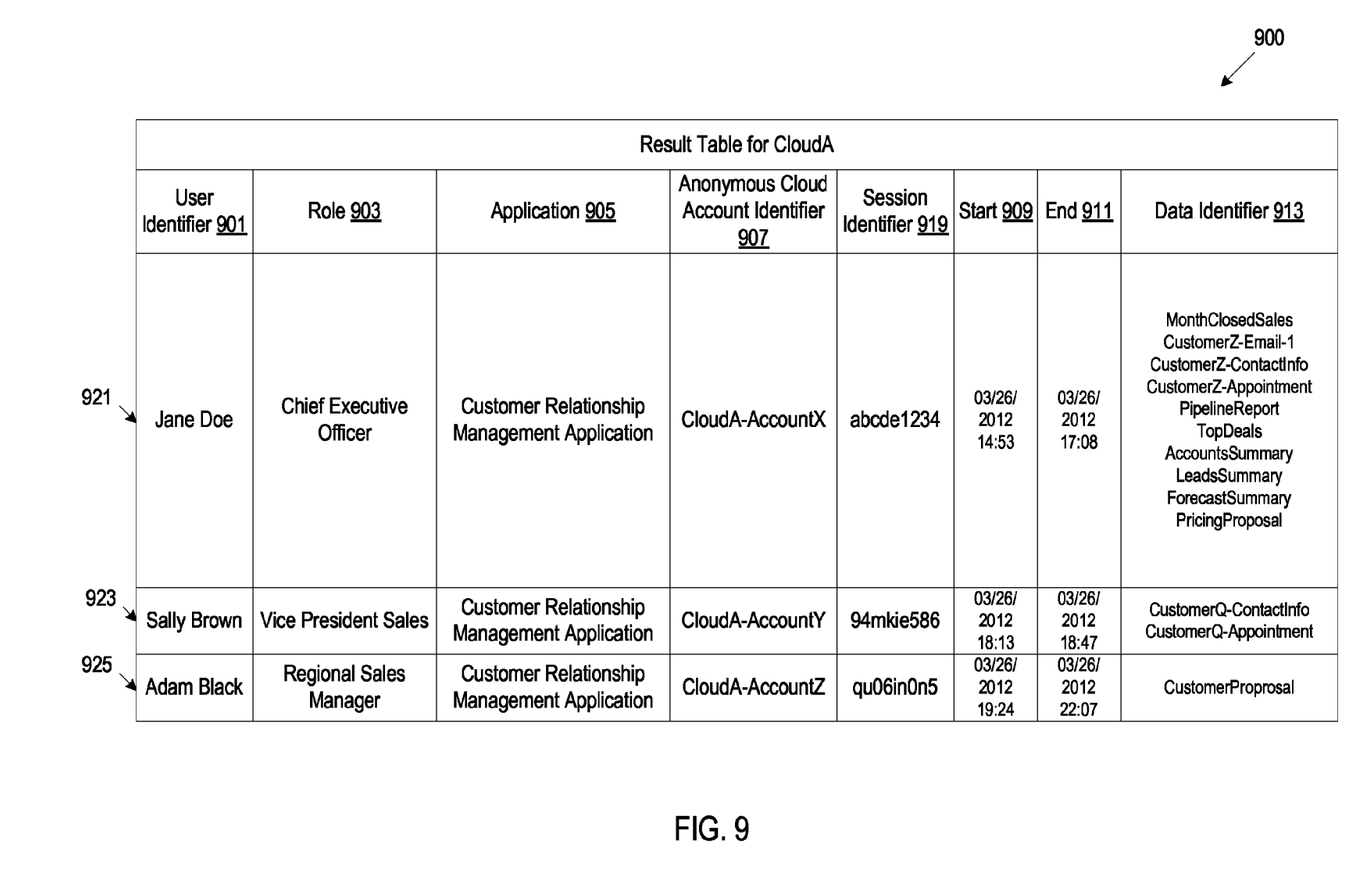
FIG. 9 is a block diagram of an exemplary computer system that may perform one or more of the operations described herein.

FIG. 9 illustrates an exemplary result table 800, according to some embodiments. The result table 900 is created, for example, by joining fields of three tables, such as, a mapping data table (e.g., mapping table 600 in FIG. 6), a cloud access pattern data table (e.g., cloud access pattern data 701 in FIG. 7), and identity attributes table (e.g., identity attributes table 500 in FIG. 5). The database join function can be performed, for example, based on the anonymous cloud account identifier field first to join the mapping data table with the cloud access pattern data table to create a result table. Subsequently, a join function can be performed based on the user identifier field to join the result table with the identity attributes table. The result table 900 can include records 921,923,925 which have fields that indicate which user is associated with a particular anonymous cloud account identifier, the role of the user, the application in the cloud that the user accessed, and the data in the cloud that the user accessed. For each record, the fields can include, for example, and not limited to, a user identifier field 901, a role field 903, an application field 905, an anonymous cloud account identifier field 907, a session identifier field (or a session token field) 819, a start field 909, an end field 911, and a data identifier field 913. For example, record 923 indicates that Sally Brown is the Vice President of Sales, accessed a Customer Relationship Management Application in the Cloud A, and accessed, in particular, the CustomerQ-ContactInfo and the CustomerQ-Appointment data in the CRM application in the CloudA.

Figure 10:
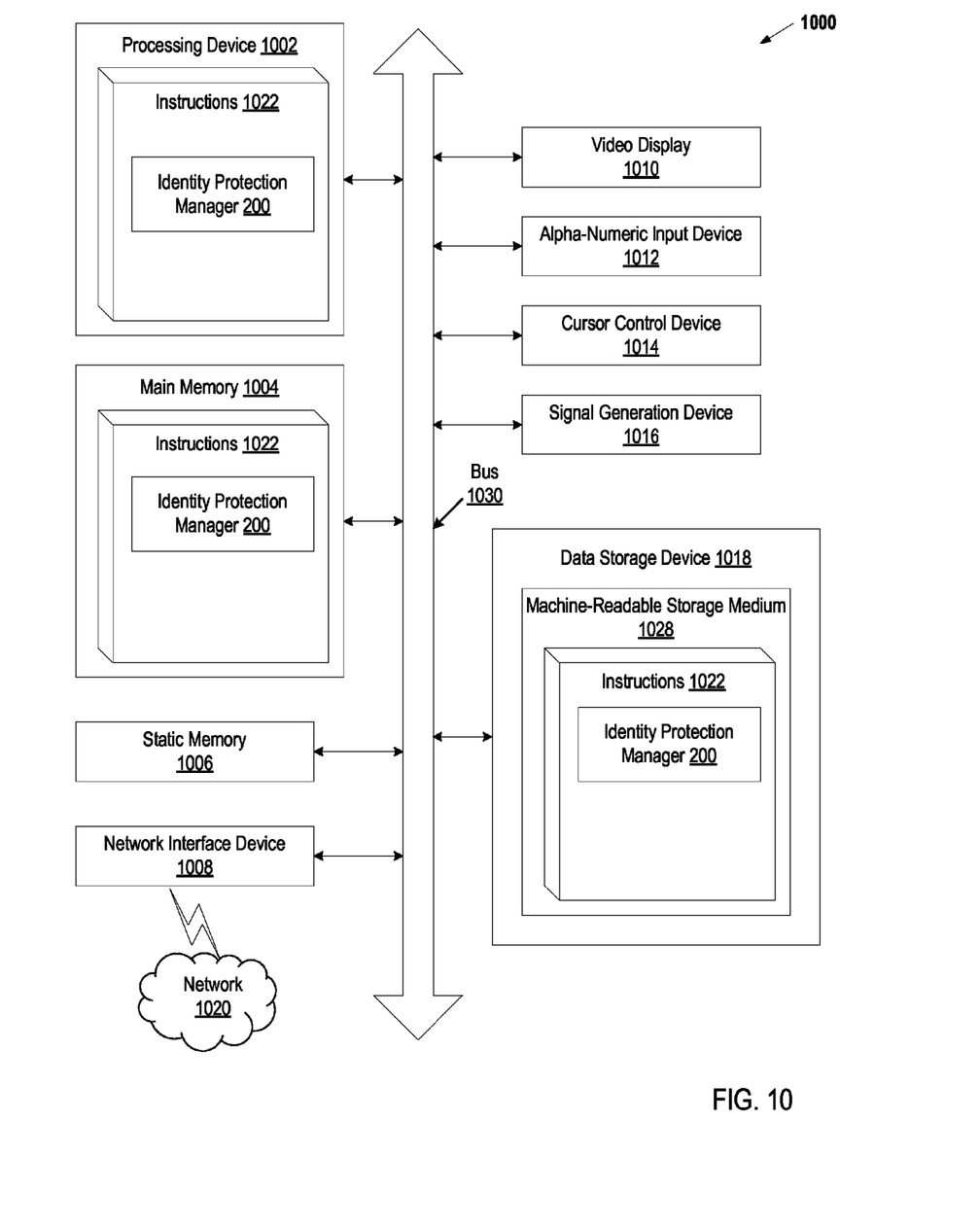
FIG. 10 illustrates a diagram of a machine in the exemplary form of a computer system in which some embodiments of the disclosure may operate.

FIG. 10 illustrates a diagram of a machine in the exemplary form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device (processor) 1002, a main memory 1004 (e.g., read-only memory (ROM), flash memory, dynamic random access memory (DRAM) such as synchronous DRAM (SDRAM), double data rate (DDR SDRAM), or DRAM (RDRAM), etc.), a static memory 1006 (e.g., flash memory, static random access memory (SRAM), etc.), and a data storage device 1018, which communicate with each other via a bus 1030.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute instructions 1022 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a computer-readable storage medium 1028 on which is stored one or more sets of instructions 1022 (e.g., software) embodying any one or more of the methodologies or functions described herein. The instructions 1022 may also reside, completely or at least partially, within the main memory 1004 and/or within the processor 1002 during execution thereof by the computer system 1000, the main memory 1004 and the processor 1002 also constituting computer-readable storage media. The instructions 1022 may further be transmitted or received over a network 1020 via the network interface device 1008.

In one embodiment, the instructions 1022 include instructions for an identity protection manager (e.g., identity protection manager 200 of FIG. 2) and/or a software library containing methods that call the identity protection manager. While the computer-readable storage medium 1028 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "assigning", "creating", "facilitating", "providing", "receiving," "correlating," "joining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    assigning, by a server computer system, an anonymous cloud account to a user in response to a determination that identity information of the user is validated for a user request to access a cloud, wherein the anonymous cloud account does not reveal an identity of the user to the cloud;
    creating mapping data associating the user with the anonymous cloud account, wherein the mapping data is not made available to the cloud;
    facilitating user access to the cloud based on the anonymous cloud account;
    receiving, by the server computer system, cloud access pattern data associated with the anonymous cloud account from the cloud, wherein the cloud access pattern data is generated by the cloud for the anonymous cloud account without the cloud determining the identity of the user; and
    correlating the cloud access pattern data with the mapping data to identify the user that accessed cloud content specified in the cloud access pattern data.

2. The method of claim 1, wherein the anonymous cloud account comprises an anonymous cloud account identifier that does not reveal the identity of the user to the cloud and further comprising:
    providing the anonymous cloud account identifier to the cloud, wherein cloud access pattern data using the anonymous cloud account identifier is generated by the cloud.

3. The method of claim 1, wherein the cloud access pattern data is a cloud access pattern database table and the mapping data is a mapping database table.

4. The method of claim 1, wherein correlating the cloud access pattern data with the mapping data comprises:
    joining fields of a cloud access pattern database table and a mapping database table.

5. The method of claim 1, wherein the cloud access pattern data comprises an anonymous cloud account identifier, an access start time indicator, an access end time indicator, and content identifiers of cloud content that is being accessed using the anonymous cloud account.

6. The method of claim 1, wherein the mapping data comprises a user identifier, an access start time indicator, an access end time indicator, and an anonymous cloud account identifier of the anonymous cloud account that is assigned to the user.

7. A system comprising:
    a memory; and
    a processor coupled with the memory to:
        assign an anonymous cloud account to a user in response to a determination that identity information of the user is validated for a user request to access a cloud, wherein the anonymous cloud account does not reveal an identity of the user to the cloud;
        create mapping data associating the user with the anonymous cloud account, wherein the mapping data is not made available to the cloud;
        facilitate user access to the cloud based on the anonymous cloud account;
        receive cloud access pattern data associated with the anonymous cloud account from the cloud, wherein the cloud access pattern data is generated by the cloud for anonymous cloud account without the cloud determining the identity of the user; and
        correlate the cloud access pattern data with the mapping data to identify the user that accessed cloud content specified in the cloud access pattern data.

8. The system of claim 7, wherein the anonymous cloud account comprises an anonymous cloud account identifier that does not reveal the identity of the user to the cloud and the processor is further configured to:
    provide the anonymous cloud account identifier to the cloud, wherein cloud access pattern data using the anonymous cloud account identifier is generated by the cloud.

9. The system of claim 7, wherein the cloud access pattern data is a cloud access pattern database table and the mapping data is a mapping database table, and the processor is configured to correlate the cloud access pattern data with the mapping data by joining fields of the cloud access pattern database table and the mapping database table.

10. The system of claim 7, wherein the cloud access pattern data comprises an anonymous cloud account identifier, an access start time indicator, an access end time indicator, and content identifiers of cloud content that is being accessed using the anonymous cloud account.

11. The system of claim 7, wherein the mapping data comprises a user identifier, an access start time indicator, an access end time indicator, and an anonymous cloud account identifier of the anonymous cloud account that is assigned to the user.

12. A non-transitory computer readable storage medium including instructions that, when executed by a processor, cause the processor to perform a method comprising:
    assigning, by the processor, an anonymous cloud account to a user in response to a determination that identity information of the user is validated for a user request to access a cloud, wherein the anonymous cloud account does not reveal an identity of the user to the cloud;
    creating mapping data associating the user with the anonymous cloud account, wherein the mapping data is not made available to the cloud;
    facilitating user access to the cloud based on the anonymous cloud account;
    receiving, by the processor, cloud access pattern data associated with the anonymous cloud account from the cloud, wherein the cloud access pattern data is generated for the anonymous cloud account without the cloud determining the identity of the user; and correlating the cloud access pattern data with the mapping data to identify the user that accessed cloud content specified in the cloud access pattern data.

13. The non-transitory computer readable storage medium of claim 12, wherein the anonymous cloud account comprises an anonymous cloud account identifier that does not reveal the identity of the user to the cloud and the method further comprises:

providing the anonymous cloud account identifier to the cloud, wherein cloud access pattern data using the anonymous cloud account identifier is generated by the cloud.

14. The non-transitory computer readable storage medium of claim 12, wherein the cloud access pattern data is a cloud access pattern database table and the mapping data is a mapping database table.

15. The non-transitory computer readable storage medium of claim 14, wherein correlating the cloud access pattern data with the mapping data comprises:

joining fields of the cloud access pattern database table and the mapping database table.

16. The non-transitory computer readable storage medium of claim 12, wherein the cloud access pattern data comprises an anonymous cloud account identifier, an access start time indicator, an access end time indicator, and content identifiers of cloud content that is being accessed using the anonymous cloud account.

17. The non-transitory computer readable storage medium of claim 12, wherein the mapping data comprises a user identifier, an access start time indicator, an access end time indicator, and an anonymous cloud account identifier of the anonymous cloud account that is assigned to the user.

* * * * *